United States Patent
Walley et al.

(10) Patent No.: US 7,953,038 B2
(45) Date of Patent: May 31, 2011

(54) METHOD AND SYSTEM FOR ENVIRONMENT CONFIGURATION BY A DEVICE BASED ON AUTO-DISCOVERY OF LOCAL RESOURCES AND GENERATING PREFERENCE INFORMATION FOR THOSE RESOURCES

(75) Inventors: John Walley, Ladera Ranch, CA (US); Arya Behzad, Poway, CA (US); Mark Buer, Gilbert, AZ (US); Jeyhan Karaoguz, Irvine, CA (US); Alexander MacInnis, Ann Arbor, MI (US); Thomas Quigley, Franklin, NC (US)

(73) Assignee: Broadcom Corporation, Irvine, CA (US)

( * ) Notice: Subject to any disclaimer, the term of this patent is extended or adjusted under 35 U.S.C. 154(b) by 792 days.

(21) Appl. No.: 11/865,799

(22) Filed: Oct. 2, 2007

(65) Prior Publication Data

US 2009/0022096 A1 Jan. 22, 2009

Related U.S. Application Data

(60) Provisional application No. 60/950,991, filed on Jul. 20, 2007.

(51) Int. Cl.
*H04W 4/00* (2009.01)
*H04L 12/28* (2006.01)
*G06F 15/177* (2006.01)

(52) U.S. Cl. ......... 370/328; 370/338; 370/400; 709/220

(58) Field of Classification Search .......... 709/220–229; 370/328, 329, 338, 351–354, 356, 386, 389, 370/392, 400–402

See application file for complete search history.

(56) References Cited

U.S. PATENT DOCUMENTS 7,203,486 B2 * 4/2007 Patel .............................. 455/420
7,685,257 B2 * 3/2010 King et al. ..................... 709/219

(Continued)

FOREIGN PATENT DOCUMENTS

EP 1562354 8/2005

(Continued)

OTHER PUBLICATIONS

Extended European Search Report corresponding to European Patent Application Serial No. 08012488.6-2416, dated Nov. 19, 2008, 3 pages.

(Continued)

*Primary Examiner* — Tri H Phan
(74) *Attorney, Agent, or Firm* — McAndrews, Held & Malloy, Ltd.

(57) ABSTRACT

Methods and systems for environment configuration by a device based on auto-discovery of local resources and generating preference information for those resources are disclosed and may include discovering available networked resources utilizing a wireless mobile communication device (WMCD). Wireless communication may be established with one or more of the available networked resources utilizing the WMCD, which may then configure the resources according to user preferences. The user preferences may be stored internal or external to the WMCD, and may be modified based on subsequent changes to the configuring of the resources. The WMCD may communicate with the resources utilizing one or more of a plurality of wireless protocols, which may comprise cellular, WLAN, near-field communication, Bluetooth, and radio frequency identification. The WMCD may auto-discover as well as determine and authenticate access privileges for the resources, which may comprise devices for adjusting a user's local environment.

27 Claims, 5 Drawing Sheets

U.S. PATENT DOCUMENTS

| | | | |
|---|---|---|---|
| 2004/0116115 A1* | 6/2004 | Ertel | 455/426.2 |
| 2004/0235463 A1 | 11/2004 | Patel | |
| 2005/0071879 A1 | 3/2005 | Haldavnekar et al. | |
| 2005/0276229 A1* | 12/2005 | Torabi | 370/252 |
| 2005/0278419 A1* | 12/2005 | Morris | 709/203 |
| 2007/0093258 A1* | 4/2007 | Steenstra et al. | 455/456.5 |
| 2008/0313315 A1* | 12/2008 | Karaoguz et al. | 709/222 |
| 2009/0022117 A1* | 1/2009 | Quigley et al. | 370/338 |

FOREIGN PATENT DOCUMENTS

| | | |
|---|---|---|
| EP | 2190245 A1 * | 5/2010 |
| KR | 2005-0070152 | 7/2005 |
| KR | 2006-0071299 | 6/2006 |
| WO | WO 00/17737 | 3/2000 |
| WO | WO 03/036397 | 5/2003 |
| WO | WO 2004031488 A1 * | 4/2004 |
| WO | WO 2005/078676 | 8/2005 |
| WO | WO 2005078676 A2 * | 8/2005 |

OTHER PUBLICATIONS

Seagate Technology LLC, Seagate D.A.V.E. (Digital Audio Video Experience) Transform the consumer experience with the Seagate D.A.V.E. design concept, Data Sheet 2007.

Seagate Technology LLC, Seagate D.A.V.E. (Digital Audio Video Experience) The portable storage platofrm that collects, plays and manages digital content, Product Overview, 2007.

* cited by examiner

METHOD AND SYSTEM FOR ENVIRONMENT CONFIGURATION BY A DEVICE BASED ON AUTO-DISCOVERY OF LOCAL RESOURCES AND GENERATING PREFERENCE INFORMATION FOR THOSE RESOURCES

CROSS-REFERENCE TO RELATED APPLICATIONS/INCORPORATION BY REFERENCE

This application makes reference to and claims priority to U.S. Provisional Application Ser. No. 60/950,991, filed on Jul. 20, 2007, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for environment configuration by a device based on auto-discovery of local resources and generating preference information for those resources.

BACKGROUND OF THE INVENTION

The field of wireless communication has seen dramatic growth the last few years. In today's world, most people use their wireless devices, be it cellular phones, PDA's, laptops, and/or other devices, for various purposes, business and personal, on a constant and daily basis. Society is truly becoming a wireless one. Many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA2000 may incorporate substantial data capabilities. Most of today's cellular services may include such features as text messaging, video streaming, web browsing . . . etc.

Some mobile devices have the capability to utilize one or more wireless technologies. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal may also be connected to a campus-wide WLAN network through an access point (AP) located within the building. Also, cellular technology may allow use of the mobile phone as a form of wireless modem that allows connecting a laptop, for example, to the internet via a cellular network.

Just as with other electronic devices, wireless communication devices have seen substantial growth in performance capability and speed. As such, they are finding applications in areas not predicted when first introduced to give users mobile telephony. They may comprise mini computers, multimedia players, GPS devices and many other applications, for example.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for environment configuration by a device based on auto-discovery of local resources and generating preference information for those resources, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for environment configuration by a device based on auto-discovery of local resources and generating preference information for those resources either directly or translated. The preference information may be directly generated, or translated. Exemplary aspects of the invention may comprise discovering available networked resources utilizing a wireless mobile communication device (WMCD). Wireless communication may be established with one or more of the available networked resources utilizing the WMCD, which may then configure the resources according to user preferences. The user preferences may be stored internal or external to the WMCD, and may be modified based on subsequent changes to the configuring of the resources. The WMCD may communicate with the resources utilizing one or more of a plurality of wireless protocols, which may comprise cellular, WLAN, near-field communication, Bluetooth, and/or radio frequency identification. The WMCD may auto-discover as well as determine and authenticate access privileges for the resources, which may comprise devices for adjusting a user's local environment.

Figure 1:
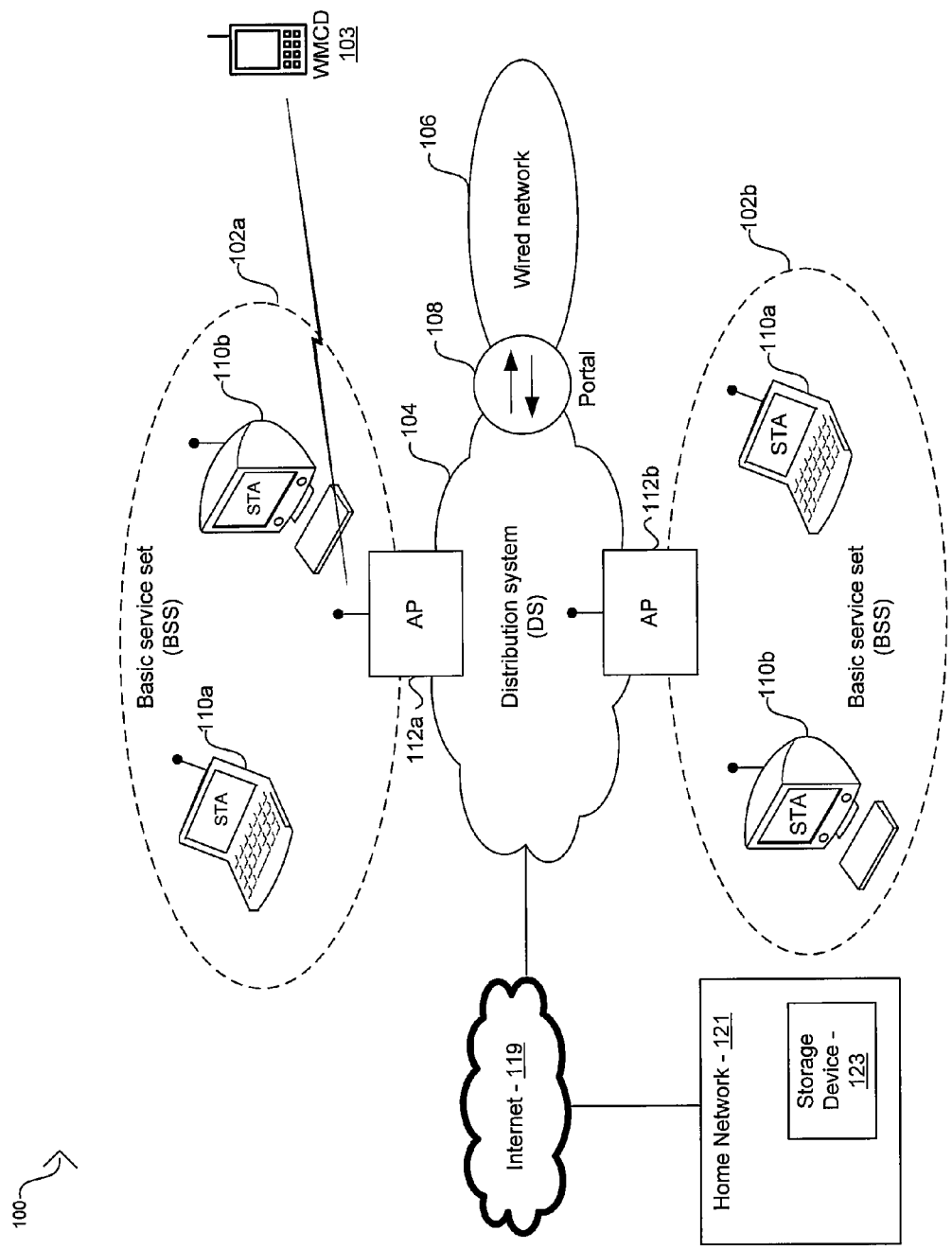
FIG. 1 is a block diagram of an exemplary WLAN infrastructure network comprising basic service sets (BSSs) integrated using a common distribution system (DS), in accordance with an embodiment of the invention.

FIG. 1 is a block diagram of an exemplary WLAN infrastructure network comprising basic service sets (BSSs) integrated using a common distribution system (DS), in accordance with an embodiment of the invention. Referring to FIG. 1, the exemplary WLAN infrastructure network 100 shown may comprise a wireless mobile communication device (WMCD) 103, a first BSS 102a, a second BSS 102b, a DS 104, a wired network 106, a portal 108, a first access point (AP) 112a, a second AP 112b, a home network 121, the Internet 119 and a plurality of WLAN stations 110a and 110b.

The WMCD 103 may comprise suitable circuitry, logic and/or code that may be enabled to provide wireless communication between a user and networked resources. In an exemplary embodiment of the invention, the WMCD 103 may comprise a cellular phone that may be capable of communicating utilizing multiple wireless protocols such as cellular, WLAN, WiMax, Bluetooth, RFID and NFC, for example.

The BSSs 102a and 102b may represent a fundamental building block of the IEEE 802.11 (WLAN) architecture and may be defined as a group of stations that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, may be implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 may be logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The WLAN stations 110a and 110b correspond to WLAN-enabled terminals that comprise suitable hardware, logic, circuitry, and/or code that may be adapted to provide connectivity to the WLAN infrastructure network 100 via the APs. The WLAN station 110a shown is a laptop computer and may correspond to a mobile station or terminal within the BSS and the WLAN station 110b shown is a desktop computer and may correspond to a fixed or stationary terminal within the BSS. Each BSS may comprise a plurality of mobile or fixed stations and may not be limited to the exemplary implementation shown in FIG. 1A.

The home network 121 may comprise a WMCD user's home network, and may comprise storage devices, such as the storage device 123. Data such as user preferences and/or multimedia content that a user may wish to access from remote networks may be stored on the storage device 123 in the home network 121. User preferences may comprise access privileges to networked resources, environmental conditions and entertainment preferences, for example.

In operation, a wireless mobile communication device (WMCD) user may wish to utilize resources within a BSS. Preferences for a resource may be established for a WMCD user and may be stored locally on the WMCD 103 or on the home network 121, or other remote device or service. The WMCD 103 may communicate with a home network via the AP 112a in the BSS 102a to obtain user preferences for one or more resources that may be utilized in instances when preferences may not be stored on the WMCD 103. The WMCD 103 may verify that a user may have access privileges to a particular resource and may establish access based on stored access privilege date, for example. The WMCD 103 may be capable of communicating with a local network via a plurality of wireless protocols.

Figure 2:
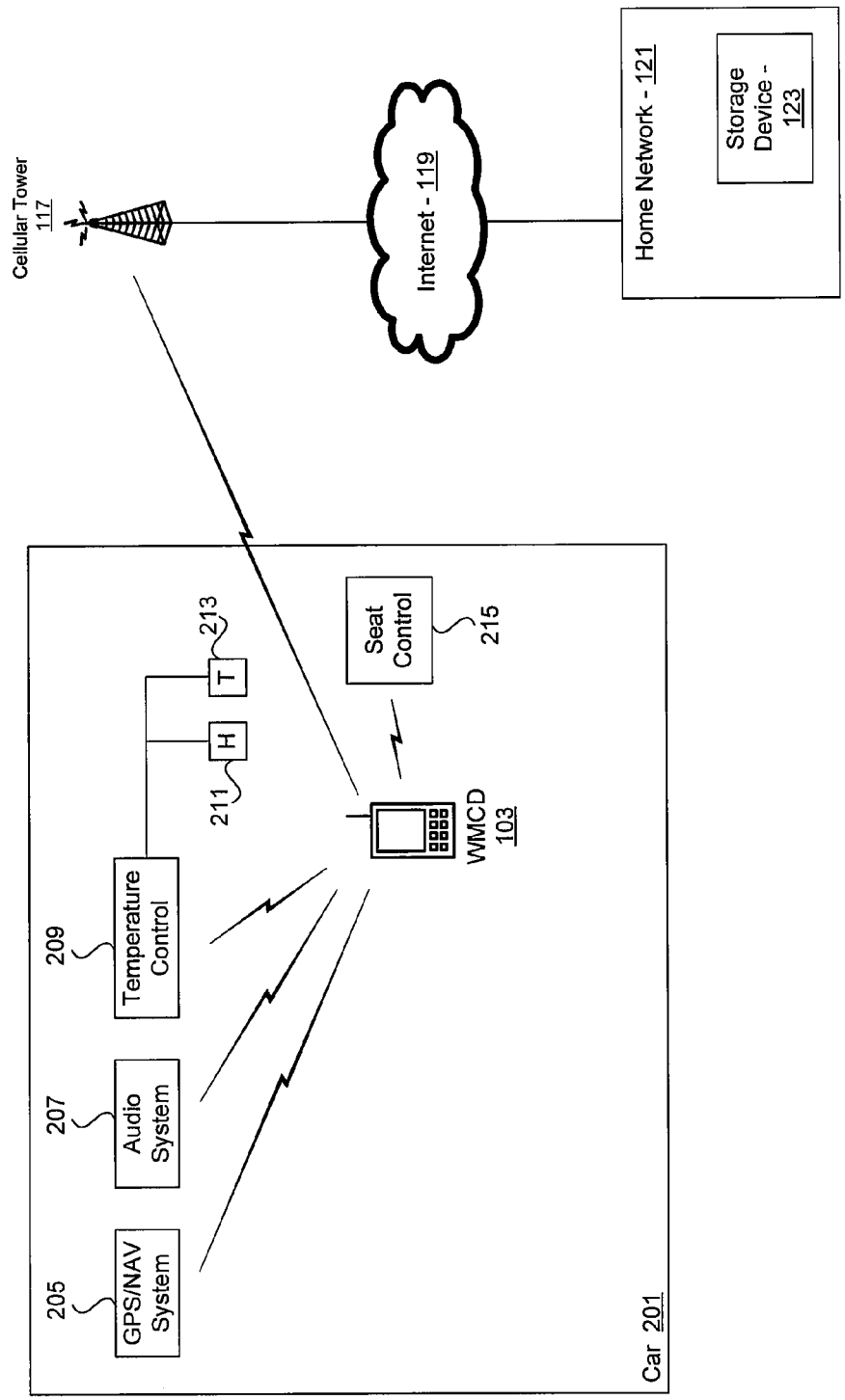
FIG. 2 is a block diagram of exemplary resource utilization via a wireless mobile communication device, in accordance with an embodiment of the invention.

FIG. 2 is a block diagram of an exemplary resource utilization via a wireless mobile communication device, in accordance with an embodiment of the invention. Referring to FIG. 2, there is shown a car 201, a cellular tower 117, the Internet 119 and a home network 121. The car 201 may comprise a global positioning system/navigation system GPS/NAV 205, an audio system 207, a temperature control system 209, a humidity sensor 211, a temperature sensor 213 and a seat control 215. The WMCD 103 may be carried by a user within the car 201. The home network 121 may comprise a storage device 123, which may be enabled to store data to be used by other devices that may communicate with the home network 121.

The GPS/NAV 205 may comprise suitable circuitry, logic and/or code that may enable detection of global positioning signals that may be utilized for determining location and/or directions to a desired location via a navigation screen within the car 201.

The audio system 207 may comprise suitable circuitry, logic and/or code that may enable reception of AM, FM and/or satellite radio signals, playback of stored audio data, such as CD and/or MP3 data, for example. The audio system 207 may comprise wireless protocol capability for communicating with wireless devices such as the WMCD 103, for example.

The temperature control system 209 may comprise suitable circuitry, logic and/or code that may enable control of the temperature within the car 201. The temperature control system 209 may receive input signals from the humidity and temperature sensors 211 and 213, respectively. The temperature control system 209 may also comprise wireless protocol capability for communicating with wireless devices such as the WMCD 103, for example.

The temperature sensor 213 may comprise suitable circuitry, logic and/or code that may enable sensing of the ambient temperature of the environment inside and outside the car. In another embodiment of the invention, the temperature sensor 213 may be capable of sensing the temperature of the user of the WMCD 103 in conjunction with the temperature inside and/or outside the car 201. The temperature sensor 213 may be coupled to the temperature control system 209 for control of the temperature within the car 201.

The humidity sensor 213 may comprise suitable circuitry, logic and/or code that may enable sensing of the ambient humidity of the air within the car 201. The humidity sensor 213 may be coupled to the temperature control system 209 for control of the humidity of the air within the car 201.

The seat control 215 may comprise suitable circuitry, logic and/or code that may enable control of a seat position within the car 201 as per user preference. The seat control 215 may comprise wireless protocol capability for communicating with wireless devices such as the WMCD 103, for example, or may be coupled to a wireless device, such as a central wireless router in the car 201.

In another embodiment of the invention, each of the devices, the GPS/NAV 205, the audio system 207 and the seat control 215, may be coupled to a centralized communication device that may be capable of communicating with wireless devices, such as the WMCD 103, as opposed to each device wirelessly communicating with the WMCD 103.

The cellular tower 117, the Internet 119 and the Home Network 121 may comprise network resources available to the WMCD 103 to enable communication with external networked resources. User preferences may be stored in external resources, such as a storage device 123 within the home network 121. The cellular tower 117 and the Internet 119 may provide access for the WMCD 103 to these resources. In another embodiment of the invention, the WMCD 103 may communicate with the home network 121 via the Internet 119 utilizing a WLAN or WiMax network.

In operation, the WMCD 103 may be located within the car 201 carried by a user. The WMCD 103 may auto-discover the available resources and determine whether it has access privileges to communicate with and/or control the available resources. The preferences of the user, such as favorite radio stations, temperature and humidity level within the car 201 and seat position, for example, may be stored within the WMCD 103 or may be stored remotely, such as in the home network 121, for example. The preferences may be communicated to the respective resource, such as the audio system 207, the temperature control system 209 and/or the seat control 215. The activation of the controls, as configured by the user preferences, may be automatically enabled, or may require an activation by the user, or by approval from another user that may control the local resources. The conditions adjusted by the WMCD 103 may revert to their prior state once the WMCD 103 has moved a predefined distance away, for example.

In another exemplary embodiment of the invention, a user may have selected a desired location, such as a restaurant, for example, to travel to utilizing the car 201. Upon entry to the car 201, the WMCD 103 may establish communication with and enter the desired location into the GPS/NAV 205, which may then plot the appropriate course on a display. The WMCD 103 may also communicate with and/or control the other resources within the car 201, such as the audio system 207, temperature control 209 and/or the seat control 215, according to the preferences of the user. In instances where there may be multiple WMCDs within the car 201, a compromise setting may be determined for each resource, such as an average temperature according to the ranges given by the preferences of each user, for example.

The WMCD 103 may be enabled to establish permission rights, and/or provide authentication or security parameters to a local resource, depending on the requirements of the resources, to allow the WMCD 103 to control local resources.

The WMCD 103 may also enable the communication of multimedia data to resources within the car 201. For example, the WMCD 103 may communicate with a storage device within the home network 121 via the cellular tower 117 and the Internet 119, and download music, to the audio system 207 for playback in the car 201. In another embodiment of the invention, the WMCD 103 may filter the preferences according to the location of the local resources. For example, if the WMCD 103 is in a location where a favorite station is not available, the WMCD 103 may filter this item from the preferences in this instance.

Figure 3:
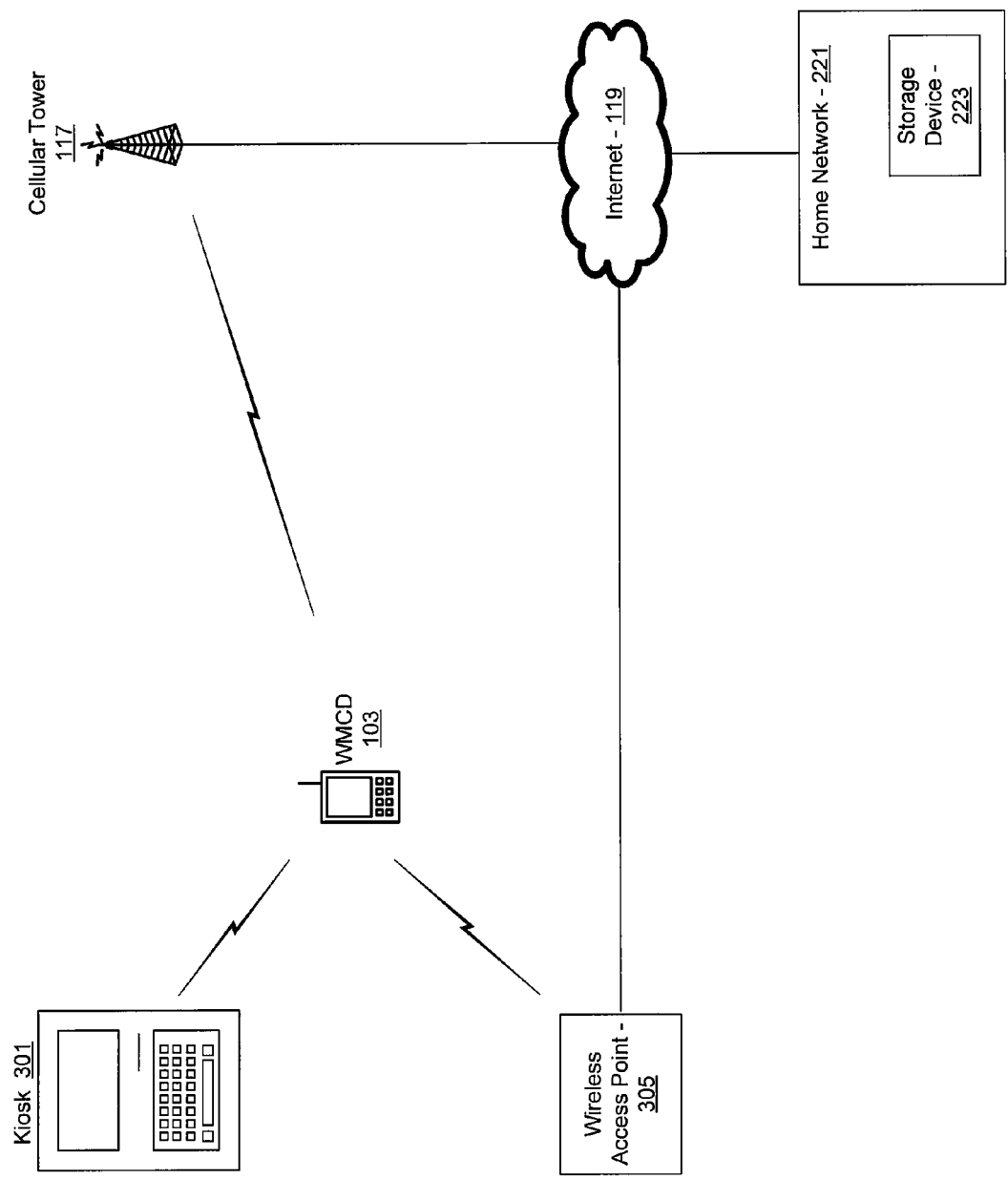
FIG. 3 is a block diagram of exemplary resource utilization via a wireless mobile communication device, in accordance with an embodiment of the invention.

FIG. 3 is a block diagram of another exemplary resource utilization via a wireless mobile communication device, in accordance with an embodiment of the invention. Referring to FIG. 3, there is shown a kiosk 301, the WMCD 103, a wireless access point 305, the cellular tower 117, the Internet 119 and the home network 121. The cellular tower 117, the Internet 119 and the home network 121 may be the same as described with respect to FIG. 2, and may enable communication of the WMCD 103 with resources within the home network 121.

The kiosk 301 may comprise a user terminal that may enable a user to perform registration activities, such as checking in to a hotel. The kiosk 301 may comprise wireless communication capability such that the WMCD 103 may establish communication with the kiosk 301 and download user preferences to the kiosk 301. The user preferences may be stored locally within the WMCD 103 or externally, such as in the home network 121, for example. In another embodiment of the invention, the user preferences may be stored by an external entity, such a travel agency, for example, depending on the application in which the WMCD 103 may be utilized.

The wireless access point 305 may comprise suitable circuitry, logic and/or code that may enable access to external networks via the Internet 119. The wireless access point 305 may comprise multiple wireless protocol capabilities, and may enable communication between the WMCD 103 and the home network 121 via the Internet 119.

In operation, the WMCD 103 may auto-discover the available resources and determine whether it has access privileges to communicate with and/or control the available resources. Auto discovery may comprise the automatic detection of resources, as opposed to resources establishing contact with the WMCD 103, and may be accomplished by polling, for example, for available networks on a periodic or continual basis. In another embodiment of the invention, resources may "advertise", or broadcast their presence and/or capabilities to establish contact with the WMCD 103.

The WMCD 103 may be utilized to establish communication with an information kiosk, such as a check-in kiosk at a hotel for example. In an exemplary embodiment of the invention, a user may have a reservation at a hotel and may desire to check-in quickly utilizing a kiosk in the hotel lobby. The WMCD 103 may establish a wireless link with the kiosk 301 and upload user preferences to the kiosk 301. The preferences may be stored locally on the WMCD 103 or may be stored remotely, such as in a storage device within the home network 121. In this instance, the WMCD 103 may retrieve the user preferences via the wireless access point 305 and the Internet 119. In instances where a wireless access point is not available, the WMCD may retrieve remotely stored user preferences via a cellular connection to the cellular tower 117. The stored preferences may comprise language displayed by the kiosk 301, room preferences and wake-up calls, for example. The user preferences may be dynamically adjusted based on selections by the user.

The WMCD 103 may obtain information from the kiosk 301, such as local restaurants or attractions, for example, which may be pertinent to the user's preferences for types of restaurants or entertainment attractions. The WMCD 103 may complete the check-in procedure and display options for other actions the user may select. Subsequent selections may result in modification to the currently stored preferences.

Figure 4:
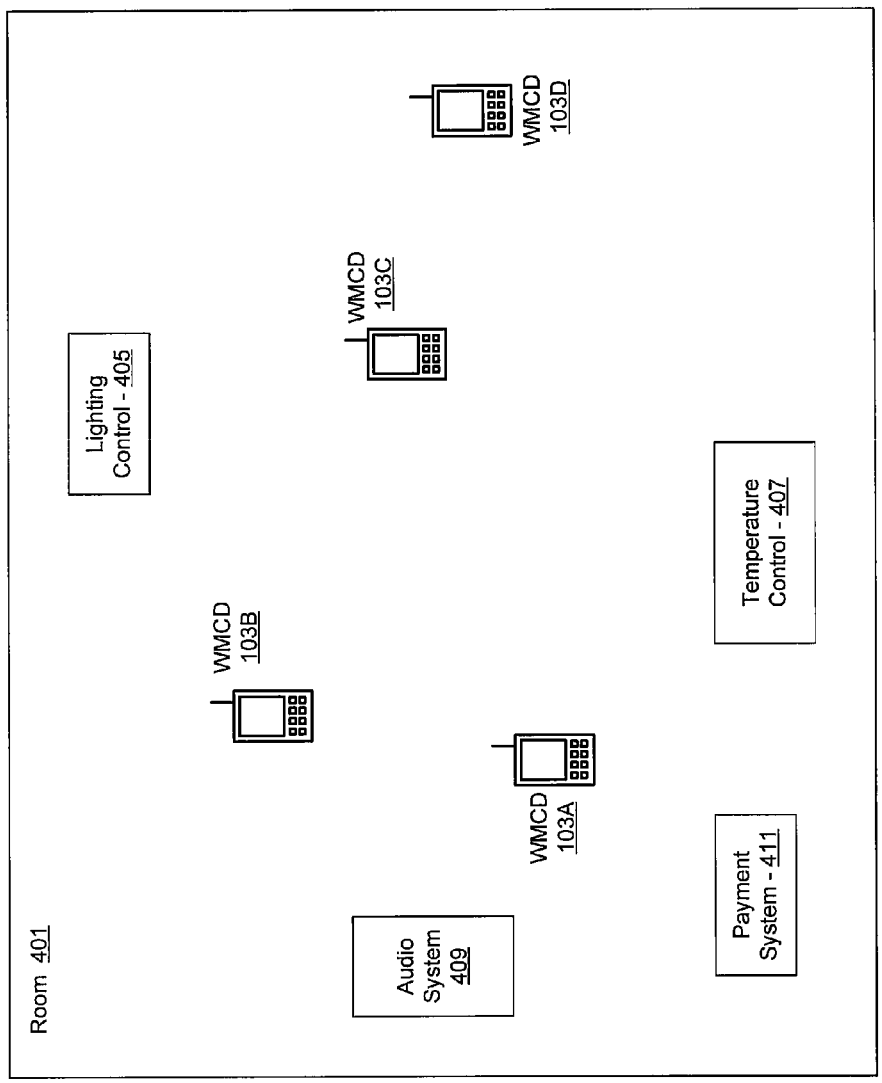
FIG. 4 is a block diagram illustrating an exemplary multi-user environment with configurable resources, in accordance with an embodiment of the invention.

FIG. 4 is a block diagram illustrating an exemplary multi-user environment with configurable resources, in accordance with an embodiment of the invention. Referring to FIG. 4, there is shown a room 401 comprising WMCDs 103A, 103B, 103C and 103D, a lighting control system 405, a temperature control system 407, an audio system 409 and a payment system 411. The room 401 may comprise a location where multiple WMCD users may be present, such as in a restaurant, or even a home, for example. The lighting control system 405, the temperature control system 407 and the audio system 409 may comprise systems that may be enabled to control the environment of the room 401, and may be capable of wireless communication with the WMCDs 103A, 103B, 103C and 103D. The payment system 411 may store data on ordered goods and services and may enable automatic payment by a WMCD user.

In operation, multiple users with WMCDs may be present in the room 401, each with distinct established preferences and each WMCD 103A, 103B, 103C and 103D may auto-discover the available resources and determine whether it has access privileges to communicate with and/or control the available resources. In instances where preferences may be numerical, such as with temperature ranges or lighting levels, the resources may be set to an average of all the ranges given by the multiple preferences. In instances where the preferences may not be numerical, such as with musical preferences, the audio system 409 may playback music of all preferences over time.

In an exemplary embodiment of the invention, the WMCDs 103A, 103B, 103C and 103D may be utilized to verify the accuracy of an order placed in a restaurant by establishing wireless communication with the payment system 411. In addition, the WMCDs 103A, 103B, 103C and 103D may be utilized to indicate that a user may require assistance from an employee of the restaurant. The WMCDs 103A, 103B, 103C and 103D may then be used to review the bill and a user may authorize payment based on preferred payment method, which may be stored locally and/or remotely. Preferences may be uploaded to a service provider, such as a restaurant in this example, for future use by the user.

In another embodiment of the invention, a user may enter a room, such as the room 401, with a plurality of local resources that may be configured. For example, a user's favorite TV stations may be programmed into a multimedia system, the frequency response of the audio system 409 may be adjusted, and color and brightness of a TV may be adjusted. The local resources are not limited to those shown in the figures. The WMCDs 103A-D may communicate with any local resource capable of communicating wirelessly, or wired to a wireless access point, for example, that may have user adjustable parameters.

Figure 5:
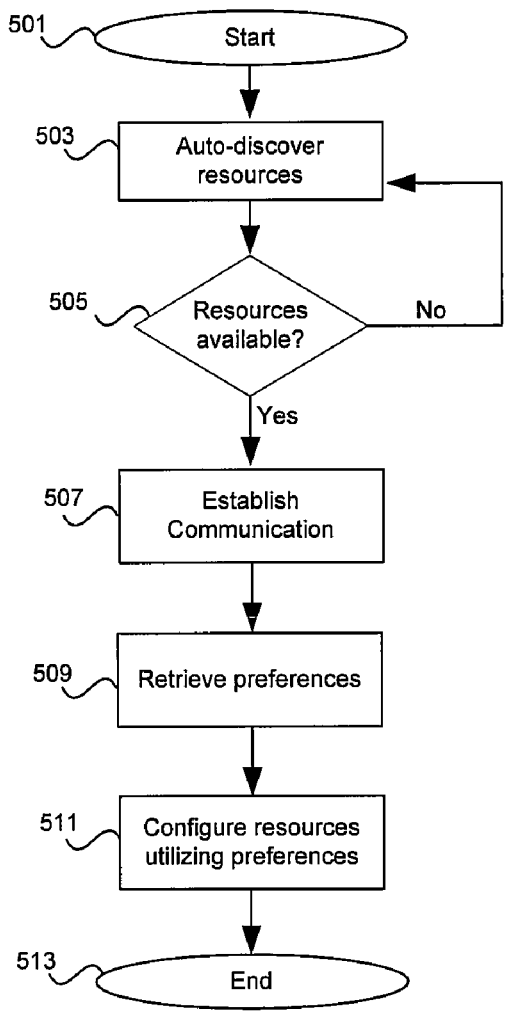
FIG. 5 is a flow diagram of an exemplary environment configuration process, in accordance with an embodiment of the invention.

FIG. 5 is a flow diagram of an exemplary environment configuration process, in accordance with an embodiment of the invention. Referring to FIG. 5, in step 503, after start step 501, a WMCD may auto-discover resources, or be contacted by local resources. In step 505, if no resources are available, the exemplary steps may repeat step 503, to continue to auto-discover resources. If resources are available, the exemplary steps may proceed to step 507 where wireless communication may be established between the WMCD and the discovered resource or resources. In step 509, the WMCD may retrieve preferences the user may have established for the discovered resource or resources. The preferences may be stored locally to the WMCD, or may be retrieved from a remote storage location, such as from a home network. In step 511, the retrieved preferences may be utilized by the WMCD to configure and/or control the resource or resources, followed by end step 513.

In an embodiment of the invention, a method and a system are disclosed for environment configuration by a device based on auto discovery of local resources and generating preference information for those resources and may comprise discovering available networked resources 205, 207, 209 and/or 215 utilizing a wireless mobile communication device (WMCD) 103. Wireless communication may be established with one or more of the available networked resources 205, 207, 209 and/or 215 utilizing the WMCD 103, which may then configure the available resources 205, 207, 209 and/or 215 according to user preferences. The user preferences may be stored internal or external to the WMCD 103, and may be modified based on subsequent changes to the configuring of the resources 205, 207, 209 and/or 215. The WMCD 103 may communicate with the resources 205, 207, 209 and/or 215 utilizing one or more of a plurality of wireless protocols, which may comprise cellular, WLAN, near-field communication, Bluetooth, and radio frequency identification. The WMCD 103 may auto-discover as well as determine and authenticate access privileges to the networked resources 205, 207, 209 and/or 215, which may comprise devices for adjusting a user's local environment.

Certain embodiments of the invention may comprise a machine-readable storage having stored thereon, a computer program having at least one code section for configuration of a device based on auto-discovery of local resources and extracting preference information from these resources either directly or translated, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for controlling a device, the method comprising:
   discovering available networked resources utilizing a wireless mobile communication device;
   establishing wireless communication with one or more of said available networked resources; and
   configuring said one or more of said available networked resources according to preferences associated with a user of said wireless mobile communication device, wherein said configuring results in a compromise between or among a plurality of different configurations from a plurality of different wireless mobile communication devices associated with said discovered available networked resources; and storing said user preferences external to said wireless mobile communication device.

2. The method according to claim 1, comprising storing said user preferences internal to said wireless mobile communication device.

3. The method according to claim 1, comprising modifying said user preferences based on subsequent changes to said configuring of said one or more of said available networked resources.

4. The method according to claim 1, wherein said wireless mobile communication device communicates with said one or more of said available networked resources utilizing one or more of a plurality of wireless protocols.

5. The method according to claim 4, wherein said wireless protocols comprise cellular, WLAN, near-field communication, Bluetooth, and radio frequency identification.

6. The method according to claim 1, comprising auto-discovering said available networked resources.

7. The method according to claim 1, wherein said available networked resources comprise devices that enable adjustment of a local environment of said user.

8. The method according to claim 1, comprising determining whether said user possesses access privileges for said one or more available networked resources.

9. The method according to claim 1, comprising authenticating said user of said wireless mobile communication device.

10. A system for controlling a device, the system comprising:
    one or more processors in a wireless mobile communication device that enables discovery of available networked resources utilizing;
    said one or more processors enables establishment of wireless communication with one or more of said available networked resources; and
    said one or more processors enables configuration of said one or more of said available networked resources according to preferences associated with a user of said wireless mobile communication device, wherein said configuring results in a compromise between or among a plurality of different configurations from a plurality of different wireless mobile communication devices associated with said discovered available networked resources; and wherein said one or more processors enable storage of said user preferences external to said wireless mobile communication device.

11. The system according to claim 10, wherein said one or more processors enable storage of said user preferences internal to said wireless mobile communication device.

12. The system according to claim 10, wherein said one or more processors enable dynamic adjustment of said user preferences based on subsequent changes to said configuring of said one or more of said available networked resources.

13. The system according to claim 10, wherein said wireless mobile communication device communicates with said one or more of said available networked resources utilizing one or more of a plurality of wireless protocols.

14. The system according to claim 13, wherein said wireless protocols comprise cellular, WLAN, near-field communication, Bluetooth, and radio frequency identification.

15. The system according to claim 10, wherein said one or more processors enable auto-discovery of said available networked resources.

16. The system according to claim 10, wherein said available networked resources comprise devices for adjusting a user's local environment.

17. The system according to claim 10, wherein said one or more processors enable determining whether said user possesses access privileges for said one or more available networked resources.

18. The system according to claim 10, wherein said one or more processors enable authentication of said user of said wireless mobile communication device.

19. A non-transitory machine-readable storage having stored thereon, a computer program having at least one code section for device control, the at least one code section being executable by a machine for causing the machine to perform steps comprising:

discovering available networked resources utilizing a wireless mobile communication device;

establishing wireless communication with one or more of said available networked resources; and configuring said one or more of said available networked resources according to preferences associated with a user of said wireless mobile communication device, wherein said configuring results in a compromise between or among a plurality of different configurations from a plurality of different wireless mobile communication devices associated with said discovered available networked resources; and wherein said at least one code section comprises code for storing said user preferences external to said wireless mobile communication device.

20. The machine readable storage according to claim 19, wherein said at least one code section comprises code for storing said user preferences internal to said wireless mobile communication device.

21. The machine readable storage according to claim 19, wherein said at least one code section comprises code for modifying said user preferences based on subsequent changes to said configuring of said available networked resources.

22. The machine readable storage according to claim 19, wherein said at least one code section comprises code for enabling communicating with said one or more of said available networked resources via said wireless mobile communication device utilizing one or more of a plurality of wireless protocols.

23. The machine readable storage according to claim 22, wherein said wireless protocols comprise cellular, WLAN, near-field communication, Bluetooth, and radio frequency identification.

24. The machine readable storage according to claim 19, wherein said at least one code section comprises code for auto-discovering said available networked resources.

25. The machine readable storage according to claim 19, wherein said available networked resources comprise devices for adjusting a local environment of said user.

26. The machine readable storage according to claim 19, wherein said at least one code section comprises code for determining whether said use possess access privileges for said one or more available networked resources.

27. The machine readable storage according to claim 19, wherein said at least one code section comprises code for authenticating said user of said wireless mobile communication device.

\* \* \* \* \*